United States Patent [19]

von Bonin et al.

[11] 4,024,090

[45] May 17, 1977

[54] PROCESS FOR MOLDING POLYURETHANE FOAMS

[75] Inventors: Wulf von Bonin; Helmut Kleimann, both of Leverkusen; Udo Post, Berg.-Gladbach, Paffrath, all of Germany

[73] Assignee: Bayer Aktiengesellschaft, Leverkusen, Germany

[22] Filed: Nov. 6, 1974

[21] Appl. No.: 521,425

[30] Foreign Application Priority Data

Dec. 20, 1973 Germany .......................... 2363452

[52] U.S. Cl. .................... 260/2.5 AH; 260/2.5 AZ; 264/300
[51] Int. Cl.² .......................................... C08K 5/54
[58] Field of Search .............. 260/2.5 AH, 2.5 AZ; 264/300

[56] References Cited

UNITED STATES PATENTS

| | | | |
|---|---|---|---|
| 3,398,104 | 8/1968 | Haluska | 260/2.5 AH |
| 3,637,783 | 1/1972 | Haluska | 260/2.5 AH |
| 3,655,581 | 4/1972 | Bachura | 260/2.5 AH |
| 3,793,300 | 2/1974 | Prokai | 260/2.5 AH |

OTHER PUBLICATIONS

Technical Information Bulletin, TIB No. 8F-4, Mobay Chemical Co., Nov. 24, 1958; 4 pages.
"Urethane Resilient Foams Made From Polyesters", Dupont, Bulletin HR-10; Feb. 15, 1956, 14 pages.

*Primary Examiner*—C. Warren Ivy
*Attorney, Agent, or Firm*—Gene Harsh; Joseph C. Gil; William E. Parry

[57] ABSTRACT

The mold release properties of a molded polyurethane foam are improved by including in the foamable reaction mixture to be molded a reaction product of a polysiloxane and a monocarboxylic acid or polycarboxylic acid.

15 Claims, No Drawings

PROCESS FOR MOLDING POLYURETHANE FOAMS

This invention relates generally to the molding of foam plastics and more particularly to a process for improving the mold release properties of a foamable mixture which produces a polyurethane foam.

Foam plastics based on polyisocyanates, e.g. polyurethane foams with a dense outer skin and cellular core such as can be obtained by the method of foaming in the mold (German Auslegeschriften No. 1,196,864 and 1,694,138 and French Patent Specification No. 1,559,325) are eminently suitable for the series production of light-weight building constructions, e.g. for the furniture, vehicle and house-building industry and for the production of elastic molded parts such as cushions, shock-absorbers or shoe soles.

Molded polyurethane products are produced by introducing a formable reaction mixture which may consist of polyisocyanates, or mixtures of a polyisocyanate and a compound which contains at least two hydrogen atoms which are reactive with isocyanates and additives into closed heatable molds in which it is foamed up and solidifies in a highly compacted state. The synthetic resin exactly fills the mold and accurately reproduces its internal surfaces.

The molds are preferably made of a material which has a high thermal capacity and high thermal conductivity, preferably a metal although other materials such as, for example, plastic, glass, wood or the like may also be used.

To prevent the molded product from adhering to the surface of the mold on removal, the mold is treated with a mold-release agent. Substances used for this purpose are e.g. waxes, soaps or oils these mold-release agents form a thin film between the surface of the mold and the molded product which prevents the molded product from sticking to the mold so that the product can be easily removed from the mold.

This method has various disadvantages for the production of one molded product after the other in the same mold. Firstly, the mold-release agent must be applied at regular intervals, during which time the mold is not available for production. Secondly, fine engravings on the mold, for example, a simulated wood structure or leather grain, gradually become covered with residue of mold-release agent in the course of time and the removal of these firmly adhering residues from molds which often have a highly structured surface is very difficult. In addition, the molded products are covered with a thin film of mold-release agent so that lacquer systems will not adhere to them. The parts must therefore to rubbed down or cleaned with solvent before they are lacquered or otherwise coated in order to obtain a sufficiently firm bond between the lacquer and the resin product.

It has already been disclosed in German Offenlegungsschrift No. 1,953,637 that the application of a mold-release agent to the mold can be dispensed with if the foamable reaction mixture is mixed with certain additives (internal mold-release agents) which impart to the finished molded product excellent release properties making it possible for it to be removed from metal molds with its surfaces intact. Salts of aliphatic carboxylic acids containing at least 25 carbon atoms with, preferably, primary amines or amines which contain amide or ester groups are known to be suitable additives of this kind.

In German Offenlegungsschrift No. 2,121,670, a process has been disclosed for the production of foam plastics by foaming a reaction mixture of polyioscyanates, compounds which contain reactive hydrogen atoms, water and/or organic blowing agents and additives in a closed mold, according to which process the additives used are for example, a mixture of (a) salts of aliphatic carboxylic acids and amines which may contain amide and/or ester groups, which salts contain at least 20 aliphatic atoms, and (b) natural and/or synthetic oils, fats or waxes.

Since these additives have an internal lubricating effect on the synthetic resin mixture, they also have the effect of imparting excellent flow properties to the mixture in the mold and reducing the formation of bubbles on the surface of the resin. In addition, these internal mold-release agents have an antistatic effect and excellent mold-release properties even in metal molds with strongly contoured surfaces.

Although excellent mold-release effects can be obtained by the known methods when molding rigid polyurethane resins, it is frequently found in practice that the mold-release effect of known "internal mold-release agents" is still not satisfactory when these agents are used for the molding of elastomeric polyurethane foams.

The problem therefore arose of finding internal mold-release agents which would have excellent mold-release properties also for the production of elastomeric polyurethane foams with a cellular core and dense outer skin by the process of foaming in the mold.

It is therefore an object of this invention to provide a process for molding foam plastics which is devoid of the foregoing disadvantages. Another object of the invention is to provide an improved process for molding polyurethane foams. Still another object of the invention is to provide an improved release agent for use in molding polyurethane foams. A further object of the invention is to provide an improved process for molding polyurethane foams having a dense skin and a cellular core. A still further object of the invention is to provide a foamable liquid composition adapted to react, expand and solidify in a mold to substantially fill the mold with a solid polyurethane foam which can be removed from the mold without undesirable sticking of the molded foam to the wall of the mold.

The foregoing objects and others are accomplished in accordance with this invention, generally speaking, by providing a foamable reaction mixture adapted to be molded and containing an organic polyisocyanate and an organic compound having reactive hydrogen atoms determinable by the Zerewitinoff method and, as an internal mold-release agent, a reaction product of a polysiloxane and a monocarboxylic acid or polycarboxylic acid. The invention also provides a process for molding the reaction mixture wherein the above foamable reaction mixture is charged to a suitable mold free from mold release agent on its inner walls, the mold is closed while the mixture reacts, expands and solidifies in the mold and the resulting molded product is freely removed from the mold.

It has not surprisingly been found that the reaction products of carboxylic acids, e.g. long-chained fatty acids or carboxyl-containing fatty acid esters, with polysiloxanes which contain —$CH_2$—OH-groups, used either alone or in combination with other mold-release agents or mold-release systems, have an excellent mold-release effect in the production of foam resins by the process of foaming in the mold, and, in addition, impart exceptionally good mold-release properties to elastomeric foam plastics.

This invention therefore relates to a process for the production of an elastomeric foam plastic wherein a reaction mixture of an organic polyisocyanate, an organic compound having a molecular weight of from about 62 to about 10,000 which contains at least two reactive hydrogen atoms, a suitable blowing agent, an internal mold-release agent and, optionally, other additives is foamed in a closed mold, characterized in that the internal mold-release agent is a reaction product of a polysiloxane which contans —CH$_2$OH-groups with a monocarboxylic or polycarboxylic acid.

The mold-release effect may be determined subjectively by manually opening a suitable mold and removing the foamed slab of molded plastics (20 × 20 × 1 cm). The mold-release forces which must be exerted to remove the molded foam plastic which has been provided with the reaction products according to the invention are considerably lower than those required for removing similar foams obtained by foaming reaction mixtures which do not contain these additives.

Any suitable organic polyisocyanate may be used in practicing the invention including aliphatic, cycloaliphatic, araliphatic, aromatic or heterocyclic polyisocyanates such as those described, for example, by W. Siefken in Justus Liebigs Annalen der Chemie, 562 pages 75 to 136, for example ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3-diisocyanate, cyclohexane-1,4-diisocyanate and any mixtures of these isomers; 1-isocyanato-3,3,5-trimethyl-5-isocyanatomethyl cyclohexane (U.S. Pat. No. 3,401,190); hexahydrotolylene-2,4-diisocyanate, hexahydrotolylene-2,6-diisocyanate and any mixtures of these isomers; hexahydro-1,3-phenylene diisocyanate, hexahydro-1,4-phenylene-diisocyanate; perhydro-2,4'-diphenylmethane diisocyanate, 4,4'-diphenylmethane-diisocyanate; phenylene-1,3-diisocyanate, phenylene-1,4-diisocyanate; tolylene-2,4-diisocyanate, tolylene-2,6-diisocyanate and any mixtures of these isomers; diphenylmethane-2,4'-diisocyanate, diphenylmethane-4,4'-diisocyanate; naphthylene-1,5-diisocyanate; triphenylmethane-4,4', 4''-triisocyanate; polyphenyl-polymethylene polyisocyanates which can be obtained by aniline-formaldehyde condensation followed by phosgenation and which have been described e.g. in British Patent Specification No. 874,430 and 848,671; perchlorinated aryl polyisocyanates as described e.g. in U.S. Pat. No. 3,277,138; polyisocyanates which contain carbodiimide groups as described in U.S. Pat. No. 3,152,162; the diisocyanates described in U.S. Pat. No. 3,492,330; polyisocyanates which contain allophanate groups as described e.g. in British Patent Specification No. 994,890, Belgian Patent Specification No. 761,626 and published Dutch Patent Application No. 7,102,524; polyisocyanates which contain isocyanurate groups as described e.g. in U.S. Pat. No. 3,001,973, German Patent Specification Nos. 1,022,789; 1,222,067 and 1,027,394 and in German Offenlegungsschriften Nos. 1,929,034 and 2,004,048; polyisocyanates which contain urethane groups as described e.g. in Belgian Patent Specification No. 752,261 or in U.S. Pat. No. 3,394,164; polyisocyanates which contain acylated urea groups according to German Patent Specification No. 1,230,778; polyisocyanates which contain biuret groups as described e.g. in U.S. Pat. Nos. 3,124,605 and 3,201,372; in British Patent Specification No. 889,050 and in French Patent Specificaton No. 7,017,514; polyisocyanates prepared by telomerization reactions as described e.g. in U.S. Pat. No. 3,654,106; polyisocyanates which contain ester groups such as those mentioned e.g. in British Patent Specification Nos. 965,474 and 1,072,956; U.S. Pat. No. 3,567,763 and German Patent Specification No. 1,231,688 and the reaction products of the above mentioned isocyanates with acetals in accordance with German Patent Specification No. 1,072,385.

The distillation residues which still contain isocyanate groups from the commercial production of isocyanates may also be used, optionally dissolved in one or more of the above mentioned polyisocyanates. Any mixtures of the above mentioned polyisocyanates may also be used.

It is generally preferred to use commercially readily available polyisocyanates, e.g. tolylene-2,4-diisocyanate and 2,6-tolylene diisocyanae and any mixtures of these isomers ("TDI"); polyphenyl-polymethylene polyisocyanates which can be obtained by aniline-formaldehyde condensation followed by phosgenation ("crude MDI") and polyisocyanates which contain carbodiimide urethane, allophanate, isocyanurate, urea or biuret groups ("modified polyisocyanates").

For preparing the semi-rigid elastic forms which are of particular interest in this invention, it is particularly preferred in the process according to the invention to use modified aromatic diisocyanates and, in particular, derivatives of diphenylmethane-4,4'-diisocyanate.

Examples of these particularly preferred polyisocyanates include 4,4'-diphenylmethane-diisocyanate which has been liquefied by partial carbodiimidization and the "liquefied" 4,4'-diphenylmethane-diisocyanate which can be obtained by reacting 1 mol of 4,4'-diphenylmethane-diisocyanate with approximately 0.1 to 0.3 mol of a dipropylene glycol or a polypropylene glycol which has a molecular weight of not more than 700.

The starting components used according to the invention for producing the foams also include organic compounds having a molecular weight generally between about 62 to about 10,000 which contain at least two hydrogen atoms determinable by the Zerewitinoff method and capable of reacting with isocyanates. Apart from compounds with amino, thiol or carboxyl groups, the starting compounds of this kind are preferably polyhydroxyl compounds, in particular those which contain from 2 to 8 hydroxyl groups, especially those with a molecular weight of about 800 to about 10,000, preferably about 1000 to about 6000, e.g. polyesters, polyethers, polythioethers, polyacetals, polycarbonates or polyester amides with at least 2, generally 2 to 8 preferably 2 to 4 hydroxyl groups, of the kind which are known per se for the production of both homogeneous and cellular polyurethanes.

Suitable polyesters with hydroxyl groups are e.g. the reaction products of polyhydric, preferably dihydric, alcohols to which trihydric alcohols may be added and polyvalent, preferably divalent, carboxylic acids. Instead of the free polycarboxylic acids, the corresponding polycarboxylic acid anhydrides or corresponding polycarboxylic acid esters of lower alcohols or mixtures thereof may be used for producing the polyesters. The polycarboxylic acids may be aliphatic, cycloaliphatic, aromatic and/or heterocyclic and may be substituted, e.g. with halogen atoms, and/or unsaturated. The following are examples of suitable carboxylic acids: succinic acid, adipic acid, suberic acid, azelaic acid, sebacic acid, phthalic acid, isophthalic acid, trimellitic acid, phthalic acid anhydride, tetrachlorophthalic acid anhydride, tetrahydrophthalic acid anhydride, hexahydrophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephthalate, diethyl terephthalate and the like. Suitable polyhydric alcohols are e.g. ethylene glycol, propylene-1,2-glycol, propylene-1,3-glycol, butylene-1,4-glycol, butylene-2,3-glycol, hexane-1,6-diol, octane-1,8-diol, neopentyl glycol, cyclohexane dimethanol (1,4-bis-hydroxymethyl cyclohexane), 2-methyl-1,3-propanediol, gylcerol, trimethylolpropane, hexane-1,2,6-triol, butane-1,2,4-triol, trimethylolethane, pentaerythritol, quinitol, mannitol, sorbitol, methyl glycoside, diethylene glycol, triethylene glycol, tetraethylene glycol, polyethylene glycol, dipropylene glycol, polypropylene glycol, dibutylene glycol, polybutylene glycol or the like. A proportion of the polyesters may also contain carboxyl end groups.

Any suitable polyesters of a lactone, e.g. ∈-caprolactone, or hydroxyl carboxylic acids, e.g. ω-hydroxycaproic acid, may also be used. The above mentioned low-molecular weight polyhydric alcohols may also be used as such.

Any suitable hydroxyl polyether with at least two, generally two to eight, preferably two or three hydroxyl groups may be used according to the invention. These polyethers are also known per se and are obtained e.g. by polymerizing epoxides such as ethylene oxide, propylene oxide, butylene oxide, tetrahydrofuran, styrene oxide or epichlorohydrin either each with itself e.g. in the presence of boron trifluoride, or by the addition of these epoxides, either as mixtures or successively, to starting components which contain reactive hydrogen atoms such as alcohols or amines, e.g. water, ethylene glycol, propylene-1,3-glycol, propylene-1,2-glycol, trimethylolpropane, 4,4'-dihydroxydiphenyl propane, aniline, ammonia, ethanolamine, ethylene diamine or the like. Sucrose polyethers such as those described e.g. in German Auslegeschriften No. 1,176,358 and 1,064,938 may also be used according to the invention. It is frequently preferred to use those polyethers which contain predominately primary hydroxyl groups (up to 90% by weight, based on all the hydroxyl groups in the polyether). Polyethers modified with vinyl polymers which can be obtained e.g. by polymerizing styrene or acrylonitrile in the presence of polyethers (U.S. Pat. Spec. Nos. 3,383,351; 3,304,273; 3,523,093 and 3,110,695 and German Patent Specification No. 1,152,536) are also suitable, and polybutadienes which contain hydroxyl groups may also be used.

Any suitable polythioether having at least two reactive hydrogens may be used, such as the condensation products of thiodiglycol with itself and/or with other glycols, dicarboxylic acids, formaldehyde, aminocarboxylic acids, amino alcohols or the like. The products obtained are polythio mixed ethers, polythioether esters or polythioether ester amides, depending on the cocomponent.

Any suitable polyacetal may be used, e.g. the compounds obtained from glycols such as diethylene glycol, triethylene glycol, 4,4'-dioxethoxy-diphenyl-dimethylmethane or hexane-diol and formaldehyde, or the like. Polyacetals suitable for the invention may also be prepared by polymerizing cyclic acetals.

Any suitable polycarbonate having hydroxyl groups may be used. These polycarbonates are known per se. For example, those which can be prepared by reacting diols such as propane-1,3-diol, butane-1,4-diol, hexane-1,6-diol, diethylene glycol, triethylene glycol or tetraethylene glycol with diaryl carbonates such as diphenyl carbonate or with phosgene may be used.

Any suitable polyester amide or polyamide may be used including e.g. the predominately linear condensates obtained from polyvalent saturated and unsaturated carboxylic acids or their anhydrides and polyvalent saturated and unsaturated amino alcohols, diamines, polyamines and mixtures thereof.

Any suitable polyhydroxyl compound which already contains urethane or urea group and modified natural polyols such as castor oil, carbohydrates or starch may be used. Addition products of alkylene oxides with phenol formaldehyde resins or with urea formaldehyde resins may also be used according to the invention.

Representative of these compounds to be used according to the invention have been described e.g. in High Polymers, Vol. XVI, "Polyurethanes, Chemistry and Technology" by Saunders-Frisch, Interscience Publishers, New York, London, Volume I, 1962, pages 32 – 42 and pages 44 – 54 and Volume II, 1964, pages 5 – 6 and 198 – 199, and in Kunststoff-Handbuch, Volume VII, Vieweg-Hochtlen, Carl-Hanser-Verlag, Munich 1966, e.g. on pages 45 to 71, the disclosures of which are incorporated herein by reference.

For producing the semi-rigid elastomeric foams with a dense outer skin which are of special interest in this invention, it is particularly preferred to use difunctional polyhydroxyl compounds of the type mentioned above, optionally mixed with up to 10 hydroxyl equivalent percent, based on the total mixture of polyhydroxyl compounds, of the higher functional and in particular trifunctional polyhydroxyl compounds.

In the process according to the invention, the reactants (including water which may be used as blowing agent) are used in proportions which correspond to an isocyanate ratio of 70 to 160 (an isocyanate ratio of 100 means that the reaction mixture contains equivalent quantities of isocyanate groups and active hydrogen atoms which enter into reaction with these isocyanate groups). For producing the semi-rigid elastomeric foams with dense outer skin which are of special interest in this invention, the isocyanate ratio is generally between 90 and 110.

According to the invention, water or any other suitable blowing agent such as a volatile organic compound may be used. The organic blowing agents used may be e.g. acetone, ethyl acetate, halogenated alkanes such as methylene chloride, chloroform, ethylidene chloride, vinylidene chloride, monofluorotrichloromethane, chlorodifluoromethane, dichlorodifluoromethane, trichlorotrifluoromethane, butane, hexane, heptane, diethyl ether or any other inert organic compound volatile at the temperature of the foaming reaction. Compounds which decompose at temperatures above room temperature to liberate gases such as nitrogen, for example azo compounds such as azo-isobutyric acid nitrile, may also be used as blowing agents. Other examples of blowing agents and details of methods of using blowing agents may be found in Kunstoff-handbuch, Volume VII, published by Vieweg and Hochtlen, Carl- Hanser Verlag, Munich 1966, e.g. on pages 108 and 109, 453 to 455 and 507 to 510, the disclosure of which is incorporated herein by reference.

Cayalysts may also be used in any catalytic amount in the process according to the invention. They may be of the kind known per se, e.g. tertiary amines such as triethylamine or tributylamine; N-methyl-morpholine; N-ethyl-morpholine; N-cocomorpholine; N,N,N',N'-tetramethyl-ethylene diamine; 1,4-diaza-bicyclo-(2,2,2)-octane; N-methyl-N'-dimethylaminoethyl-piperazine; N,N-dimethyl benzylamine; bis-(N,N-diethylaminoethyl) adipate; N,N-diethyl benzylamine; pentamethyl diethylene triamine; N,N-dimethyl cyclohexylamine; N,N,N',N'-tetramethyl-1,3-butane diamine; N,N-dimethyl-$\beta$-phenylethylamine; 1,2-dimethyl imidazole; 2-methyl imidazole or tetramethyl guanidine.

Tertiary amines containing hydrogen atoms which can react with isocyanate groups are e.g. triethanolamine; triisopropanolamine, N-methyl-diethanonlamine; N-ethyl-diethanolamine; N,N-dimethylethanolamine and their reaction products with alkylene oxides such as propylene oxide and/or ethylene oxide.

silaamines with carbon-silicon bonds may also be used as catalysts, e.g. those described in German Patent Sepcification 1,229,290, for example 2,2,4trimethyl-2-silamorpholine or 1,3-diethylaminomethyl-tetramethyl-disiloxane.

Nitrogen containing bases such as tetraalkyl ammonium hydroxides; alkali metal hydroxides such as sodium hydroxide; alkali metal phenolates such as sodium phenolate or alkali metal alcoholates such as sodium methylate may also be used as catalysts. Hexahydrotriazines are also suitable catalysts.

Organometallic compounds may also be used as catalyst according to the invention, particularly organic tin compounds. The organic tin compounds used are preferably tin (II) salts of carboxylic acids such as tin (II) acetate; tin (II) octoate; tin (II) ethyl hexoate and tin (II) laurate and the dialkyl tin salts of carboxylic acids, e.g. dibutyl tin diacetate; dibutyl tin dilaurate; dibutyl tin maleate or dioctyl tin diacetate.

Other representatives of catalysts which may be used according to the invention and details of their action may be found in Kunststoff-Handbuch, Volume VII, published by Vieweg and Hochtlen, Carl-Hanser-Verlag, Munich 1966, e.g. on pages 96 to 102, the disclosure of which is incorporated herein by reference.

The catalysts may be used in any catalytic amount, preferably, about 0.001% to about 10% by weight, based on the weight of the organic compounds having a molecular weight of about 62 to about 10,000 which contain at least two hydrogen atoms reactive with isocyanates.

Surface-active additives (emulsifiers and foam stabilizers) may also be used in the process according to the invention. Suitable emulsifiers are e.g. the sodium salts of ricinoleic sulphonates or of fatty acids or salts of fatty acids with amines such as oleic acid diethylamine or stearic acid diethanolamine. Alkali metal or ammonium salts of sulphonic acids such as dodecyl benzene sulphonic acid or dinaphthylmethane disulphonic acid or of fatty acids such as ricinoleic acid or of polymeric fatty acids may also be used as surface-active additives.

The foam stabilizers to be used are mainly water-soluble polyether siloxanes. These compounds generally have a structure such that a copolymer of ethylene oxide and propylene oxide is attached to a polydimethyl siloxane group. Foam stabilizers of this kind have been described, e.g. in U.S. Pat. No. 3,629,308.

According to the invention there may also be used reactive retarders, e.g. substances which are acid in reaction such as hydrochloric acid, sulphuric acid, phosphoric acid or organic acid halides; cell regulators known per se such as paraffins or fatty alcohols or dimethyl polysiloxanes; pigments or dyes and flame-retarding agents known per se, e.g. trischloroethyl phosphate or ammonium phosphate and polyphosphate; stabilizers against ageing and weathering; plasticizers and fungistatic and bacteriostatic substances; and fillers such as barium sulphate, kieselguhr, carbon black or whiting.

Other examples of surface-active additives, foam stabilizers, cell regulators, reaction retarders, stabilizers, flame-retarding substances, plasticizers, dyes, fillers and fungistatic and bacteriostatic substances which may also be used according to the invention if desired and details of methods of using them and their mode of action may be found in Kunststoff-Handbuch, Volume IV, published by Vieweg and Hochtlen, Carl-Hanser-Verlag, Munich 1966, e.g. on pages 103 to 113.

Foaming is carried out in molds in the process according to the invention. The reaction mixture is introduced into any suitable mold made of a metal, such as aluminum, a plastics material such as an epoxide resin, or any other suitable material. The foamable reaction mixture foams up inside the mold to form the molded product. Foaming may be carried out in such a way that the molded product has a cellular structure on its surface as well as in its core or it may be carried out to produce a product with a dense substantially non-porous skin and cellular core. According to the invention, the quantity of foamable reaction mixture introduced into the mold may be just sufficient to fill the mold when the mixture has foamed up. On the other hand, a larger quantity of reaction mixture may be introduced into the mold, in which case foaming is carried out under conditions of so-called overcharging. This method of procedure has already been disclosed, e.g. in U.S. Pat. No. 3,178,490 or 3,182,104, the disclosures of which are incorporated herein by reference.

Cold setting foams may also be produced by the process according to the invention (see British Patent specification No. 1,162,517 and German Offenlegungsschrift No. 2,153,086).

In this process of foaming in the mold, the known mold-release agents may be used in addition.

According to the invention, reaction products of polysiloxanes which contain —$CH_2$—OH-groups and monocarboxylic and/or polycarboxylic acids are included in the foamable reaction mixture as internal mold-release agents.

Any suitable polysiloxane which contains —$CH_2$—OH-groups known per se (see German Auslegesschrift No. 1,122,698) may be used. Polysiloxanes which are particularly suitable for the purpose of this invention are those which contain 1 to 6, preferably 2—$CH_2$—OH-groups in the molecule.

According to the invention it is preferred to use those polysiloxanes which have the following theoretical formula:

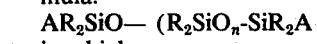

in which
$n$ has a value of from 1 to 100, preferably 3 to 20,
R represents methyl and/or phenyl and
A represents a —$CH_2$—OH-group.

It is preferred to use those straight chain polysiloxanes of the kind described above which are liquid and, especially those in which R is methyl.

Linear methyl polysiloxanes, e.g. those corresponding to the general formula above, which contain at least one —CH$_2$—OH-group group in the molecule and contain 2% to 8% by weight of hydroxyl groups have proved to be particularly useful, e.g. those represented by the following formula:

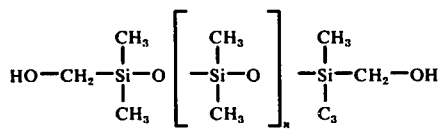

wherein $n$ is 3 to 20.

The preparation of polysiloxanes which contain —CH$_2$—OH-groups is already known (see U.S. Pat. Nos. 3,481,963 and 3,442,925) the disclosures of which are incorporated herein by reference.

Generally speaking, any known monocarboxylic and/or polycarboxylic acids or their anhydrides may be used for the reaction with the above mentioned polysiloxanes, but the fatty acids known per se are preferred.

Since the reaction takes place under esterification conditions under which the reaction of the originally two-phase mixture of polysiloxane and fatty acid results in a homogeneous reaction product, it may be presumed that the reaction products obtained are mainly ester type compounds.

The fatty acids are preferably long chain fatty acids containing from 8 to 40 carbon atoms, in particular 12 to 20 carbon atoms. Although natural or synthetic dicarboxylic and polycarboxylic acids may also be used, it has been found most suitable to use natural monocarboxylic acids or natural fatty acid mixtures, e.g. abietic acid, palmitic acid, stearic acid, oleic acid, elaidic acid, linoleic acid, ricinoleic acid, linolenic acid or commercially obtainable fatty acid mixtures such as sperm oil fatty acid, train oil fatty acid, tallow fatty acid, soya fatty acid, palm kernal fatty acid, ground nut fatty acid, tall oil fatty acid, and the like. Fatty acids and fatty acid mixtures which are liquid at room temperature are preferred.

Ricinoleic acid oligoesters and polyesters and esters of ricinoleic acid and of the above mentioned fatty acids may also be mentioned as examples of suitable fatty acid esters which contain carboxyl groups. In addition, there should be mentioned the carboxyl-containing fatty acid esters which can be obtained by cocondensation of the above mentioned fatty acids with polyols such as ethylene glycol, trimethylolpropane, glycerol, pentaerythritol or sorbitol and the like and polycarboxylic acids such as phthalic acid, maleic acid, fumaric acid, succinic acid, adipic acid, azelaic acid, tartaric acid, citric acid, and the like. It is preferred to use those fatty acid esters with carboxyl groups which can be obtained by the cocondensation of the above mentioned long chain fatty acids with pentaerythritol and adipic acid.

Particularly suitable, however are the reaction products of polysiloxanes which contain —CH$_2$—OH groups and the above mentioned long chain fatty acids, in particular oleic acid or fatty acid mixtures which contain oleic acid.

In these reaction products, at least one, preferably two, of the —CH$_2$—OH groups of the polysiloxane are esterified with fatty acid.

In addition to the above described reaction products of polysiloxanes which contain —CH$_2$—OH groups and preferably monocarboxylic acids which contain more than 8 carbon atoms in particular long chain fatty acids, however, ester-type reaction products of these polysiloxanes with polycarboxylic acids have also been found useful as mold-release agents, especially the reaction products with dicarboxylic acids or their anhydrides.

These mold-release agents are therefore esters of polysiloxanes which contain —CH$_2$—OH groups and polycarboxylic acids, in particular dicarboxylic acids. In these esters, at least one of the —CH$_2$—OH groups of the polysiloxane is esterified with the dicarboxylic acid. Although the reaction products of the above mentioned polysiloxanes and polycarboxylic acids may, of course, contain a certain proportion of oligoesters or polyesters, the aim is to react only one carboxylic group per molecule of the polycarboxylic or dicarboxylic acid for each —CH$_2$—OH group of the polysiloxane so that the resulting ester contains terminal carboxyl groups.

It is presumably the presence of these carboxyl groups which is responsible for the fact that the ester-type reaction products described above are readily soluble in most of the polyethers or polyether mixtures used for producing the foams. This is advantageous from a practical process point of view because such mold-release agents will not tend to undergo phase separation, i.e., they have good compatibility with the foamable reaction mixture.

The polycarboxylic acids used are preferably aliphatic, cycloaliphatic and/or aromatic polycarboxylic acids with 2 to 10 carbon atoms, in particular dicarboxylic acids such as methyl benzene dicarboxylic acids or their anhydrides or derivatives which are hydrogenated in the nucleus, benzene dicarboxylic acids or their anhydrides and derivatives thereof which are hydrogenated in the nucleus, sebacic acid, suberic acid, adipic acid, succinic acid, citric acid and itaconic acid or their anhydrides. Maleic acid and its anhydride are particularly suitable because of their high reactivity.

Particularly important are those reaction products in which about 50% to 100% of the —CH$_2$—OH groups in the polysiloxane are present as maleic acid semiesters because they are not only easy to prepare but also highly compatible with the polyethers (soluble) in the foaming process as well as having good mold-release characteristics.

The internal mold-release agents according to the invention may be used alone or as mixtures with each other and/or as mixtures with other mold-release agents such as those described e.g. in Offenlegungsschriften No. 1,953,637 and 2,121,670.

The reaction products which are to be used as mold-release agents according to the invention may be added as such to the starting components used for producing the foams, e.g. to the polyisocyanate and/or to the polyol. The new mold-release agents may be added in quantities of from 0.3% to 30% by weight, preferably 1% to 10% by weight, based on the total quantity of reaction mixture.

Other mold-release agents or systems may, of course, be used in addition in the foamable formulations, for example those described in German Offenlegungschriften No. 1,953,637; 2,307,589 or 2,356,692 or in Belgian Patent Specification No. 782,942, e.g. the oleic acid or tall oil fatty acid salt of the amide-containing amine which can be obtained by reacting N-dimethylamino-propylamine with oleic acid or tall oil fatty acid.

In the process according to the invention, the reactants may be reacted together by the known one-step, prepolymer or semi-prepolymer process, often using mechanical devices such as those described in U.S. Pat. Reissue 24,514. Details concerning the processing apparatus which may also be used for the process according to the invention may be found in Kunststoff-Handbuch, Volume VII, published by Vieweg and Hochtlen, Carl-Hanser-Verlag, Munich 1966, e.g. on pages 121 to 205.

The products of the process may be rigid products used for the manufacture of furniture parts, parts of car bodies, technical apparatus or building elements or they may be semi-rigid to soft products used for producing saftey cushioning in motor cars, elastomeric shoe soles, shock-absorbers, etc.

The process according to the invention will now be described with the aid of examples. The parts given are parts by wegiht unless otherwise indicated. The percentages are percentages by weight.

EXAMPLES

Preparation of the reaction products which are to be used as "internal mold-release agents."

A. 565 parts of a linear polydimethyl siloxane which has two —$CH_2$—OH end groups and a hydroxyl content of about 6% by weight and 570 parts of commercial oleic acid are stirred together for 1 hour at 100° C and then for 24 hours at 120° C in an apparatus equipped with a water separator. By the end of this time, separation of water has been completed and the originally two-phase mixture has become a homogeneous single phase so that the resulting material can be used directly as mold-release agent.

B. The procedure is the same as described in A but instead of a polysiloxane with a hydroxyl content of about 6% by weight, 1130 parts of similarly prepared polysiloxane with a hydroxyl content of about 3% by weight are used. In this case, a powerful turbo mixer is used for stirring.

C. 136 parts (approximately 1 mol) of pentaerythritol are esterified with 850 parts (approximately 3 mol) of oleic acid at 140° C. When about 70% by weight of the theoretical quantity of water has been separated, 146 parts (approximately 1 mol) of adipic acid are added and esterification is then continued until no more water separates. 560 parts of the polysiloxane used under A are then added to the resulting carboxyl-containing oleic acid ester at 100° C, and the reaction is continued as under A until, after about 24 hours, the mixture has become homogeneous.

D. The procedure is the same as under A but using 590 parts of tall oil fatty acid instead of oleic acid.

E. The procedure is as described under A but using 600 parts of ricinoleic acid instead of oleic acid.

F. 1200 parts of ricinoleic acid are stirred for 12 hours at 140° C under a water jet vacuum, ricinoleic acid ester being formed with separation of water. 500 parts of the polysiloxane used under A are then added at 100° C and the reaction is continued as described under A. The homogeneous reaction product obtained can be used as a mold-release agent.

G. 183 parts of the polysiloxane used under A are boiled with 50 parts of adipic acid in xylene, using a water separator, until separation of water ceases. The xylene is then distilled off. An oily substance remains behind, which is used as an internal mold-release agent. The IR spectrum has a distinct ester band.

H. 216 parts of the polysiloxane used under A, are refluxed in 300 parts of ethyl acetate with 80 parts of maleic acid anhydride for 10 hours. All the liquid is then distilled off under a water jet vacuum at 80° C. An oil which shows the ester band in the IR spectrum remains behind. It can be used as mold-release agent. In contrast to the polysiloxane used as a starting material, it forms a clear solution in a polyether with a molecular weight of about 4000 which is prepared by first adding 80% of propylene oxide (based on the total weight) and then 20% of ethylene oxide to propylene glycol using an alkaline catalyst in accordance with the known art. The hydroxyl number of the polyether is about 28.

I. The procedure is the same as described under H, except that only 60 parts of maleic acid anhydride are used. Although only about 75% of the hydroxyl groups of the polysiloxane are now converted into ester groups, the resulting reaction product is again soluble in the aforesaid polyether and can be used as an internal mold-release agent.

EXAMPLE 1

100 parts by weight of a polyol mixture with a hydroxyl number of 203 and a viscosity of 950 cP at 25°, consisting of 70 parts by weight of a poly(alkylene ether)glycol with a hydroxyl number of 28 which has been obtained by the addition of a mixture of 80% of propylene oxide and 20% of ethylene oxide to propylene glycol and 20 parts by weight of a poly(ethylene ether)polyol with a hydroxyl number of 32 which has been obtained by the addition of a mixture of 87% of propylene oxide and 13% of ethylene oxide to trimethylolpropane;

14 parts by weight of butane-1,4-diol,
1 part by weight of ethylene glycol,
0.6 part by weight of triethylene diamine,
0.06 part by weight of dibutyl tin (IV) dilaurate,
0.1 part by weight of water,
4 parts by weight of monofluorotrichloromethane,
2 parts by weight of methylene chloride, and
6 parts by weight of "internal mold-release agent" A are reacted with 64 parts by weight of an isocyanate containing semi-prepolymer which has been prepared by reacting 5 mols of diphenylmethane-4,4'-diisocyanate with 1 mol of tripropylene glycol. The isocyanate-content of the semi-prepolymer is 24%.

The polyol mixture and blowing agent are mixed with the isocyanate, using a two-component feeding and mixing apparatus, and introduced into a closed tempered aluminum mold. The temperature of this mold is 60° C. The synthetic resin mixture begins to foam after 9 seconds and sets after a further 10 seconds.

The molded product can be removed from the aluminum mold after 3 minutes without adhering to it. It has an overall gross density of 0.80 g/cm³ and a thickness of 10 mm with a solid marginal zone on both sides.

EXAMPLE 2

The following components are used: 100 parts by weight of a polyol mixture with a hydroxyl number of 205 and a viscosity of 950 cP at 25° C, consisting of 70 parts by weight of a poly(alkylene ether)glycol with a hydroxyl number of 28 which has been obtained by the addition of a mixture of 80% of propylene oxide and 20% of ethylene oxide to propylene glycol and 20 parts by weight of a poly(alkylene ether)polyol with a hydroxyl number of 32 which has been obtained by the addition of a mixture of 87% of propylene oxide and 13% of ethylene oxide to trimethylolpropane, as well as
14 parts by weight of butane-1,4-diol,
1 part by weight of ethylene glycol,
0.6 parts by weight of triethylene diamine,
0.06 parts by weight of dibutyl tin (IV) dilaurte, 0.1 part by weight of water,
4 parts by weight of monofluorotrichloromethane,
2 parts by weight of methylene chloride and
3 parts by weight of "internal mold-release agent" A and, in addition,
58 parts by weight of an isocyanate mixture consisting of: 43 parts by weight of a polyisocyanate based on diphenylmethane-4,4'-diisocyanate which has an isocyanate content of 30.3% and which has been liquified by a uretone-imine content of 15% and which has been obtained by mixing at about 80° C about 1000 parts (4 mols) of 4,4'-diphenylmethane diisocyanate with about 2.5 mol % of urea and heating the resulting mixture at about 225° C until said NCO-content has been reached, and
14 parts by weight of a reaction product which has been obtained by reacting 70 parts by weight of the polyisocyanate described above with 30 parts by weight of a linear polydimethyl siloxane which has two —CH$_2$—OH end groups and a hydroxyl content of about 6% by weight, the isocyanate content of the reaction product being 16%.

The polyol mixture and the blowing agent are mixed with the isocyanate mixture by means of a two-component feeding and mixing apparatus and the mixture is divided into two portions, one of which is introduced into a closed tempered steel mold and the other into a closed tempered aluminum mold. The temperature of these molds is in both cases 60° C.

The synthetic resin mixture begins to foam after 6 seconds and sets after a further 8 seconds.

The molded products can be removed after 3 minutes without adhering either to the aluminum mold or to the steel mold. They have an overall gross density of 0.80 g/cm$^3$ and a thickness of 10 mm with a solid marginal zone on both sides.

EXAMPLE 3

The following components are used:
100 parts by weight of polyol mixture with a hydroxyl number of 205 and a viscosity of 950 cP at 25° C, consisting of
70 parts by weight of a poly(alkylene ether)glycol with a hydroxyl number of 28 which has been obtained by the addition of a mixture of 80% of propylene oxide and 20% of ethylene oxide to propylene glycol and
20 parts by weight of a poly(alkylene ether)polyol with a hydroxyl number of 32 which has been obtained by the addition of a mixture of 87% of propylene oxide and 13% of ethylene oxide to trimethylolpropane;
14 parts by weight of butane-1,4-diol,
1 part by weight of ethylene glycol,
0.6 part by weight of triethylene diamine,
0.06 part by weight of dibutyl tin (IV) dilaurate,
0.1 part by weight of water,
4 parts by weight of monofluorotrichloromethane,
2 parts by weight of methylene chloride,
6 parts by weight of "internal mold-release agent" B and
69 parts by weight of an isocyanate mixture consisting of:
52 parts by weight of a semi-prepolymer which has been obtained by reacting 5 mols of diphenylmethane, 4,4'-diisocyanate with 1 mol of tripropylene glycol (the isocyanate content of the semi-prepolymer is 24%) and
17 parts by weight of a reaction product which has been prepared by reacting 70 parts by weight of polyisocyanate produced by phosgenating aniline-formaldehyde condensates with 30 parts by weight of a linear polydimethyl siloxane which contains two —CH$_2$—OH end groups and has a hydroxyl content of about 6%. The isocyanate content of the reaction product is 17.4%.

The polyol mixture and blowing agent are mixed with the isocyanate by means of a two-component feeding and mixing apparatus and introduced into a closed tempered nickel mold. The temperature of this mold is 60° C. The synthetic resin mixture begins to foam after 9 seconds and sets after a further 10 seconds.

The molded product can be removed from the nickel mold after 3 minutes without adhering to it. It has an overall gross density of 0.80 g/cm$^3$ and a thickness of 10 mm with a solid marginal zone on both sides.

EXAMPLE 4

The following components are used: 100 parts by weight of a polyol mixture with a hydroxyl number of 205 and a viscosity of 950 cP at 25° C, consisting of 70 patts by weight of a poly(alkylene ether)glycol with a hydroxyl number of 28 which has been obtained by the addition of a mixture of 80% of propylene oxide and 20% of ethylene oxide to propylene glycol and 20 parts by weight of a poly(alkylene ether)polyol with a hydroxyl number of 32 which has been obtained by the addition of a mixture of 87% of propylene oxide and 13% of ethylene oxide to trimethylolpropane, as well as
14 parts by weight of butane-1,4-diol,
1 part by weight of ethylene glycol,
0.6 part by weight of triethylene diamine,
0.06 part by weight of dibutyl tin (IV) dilaurate,
0.1 part by weight of water,
4 parts by weight of monofluorotrichloromethane,
2 parts by weight of methylene chloride,
3 parts by weight of "internal mold-release agent" B and
65 parts by weight of an isocyanate mixture which consists of:
49 parts by weight of a semi-prepolymer which has been obtained by reacting 5 mols of diphenylmethane-4,4'-diisocyanate with 1 mol of tripropylene glycol, the isocyanate content of which semi-prepolyer is 24%, and
16 parts by weight of a reaction product of:
70 parts by weight of a polyisocyanate which has been prepared by phosgenating aniline-formaldehyde condensates and 30 parts by weight of a fatty acid ester prepared from 2.5 mol of pentaerythritol, 1 mol of adipic acid and 6 mol of oleic acid.

The polyol mixture and blowing agent are mixed with the isocyanate by means of a two-component feeding and mixing apparatus and introduced into a closed tempered aluminum mold. The temperature of this mold is 60° C. The synthetic resin mixture begins to foam after 9 seconds and sets after a further 10 seconds.

The molded product can be removed from the aluminum mold after 3 minutes without adhering to it. It has an overall gross density of 0.80 g/cm³ and a thickness of 10 mm with a solid marginal zone on both sides.

EXAMPLE 5

The following components are used: 100 parts by weight of a polyol mixture with a hydroxyl number of 205 and a viscosity of 950 cP at 25° C, consisting of 70 parts by weight of a poly(alkylene ether) glycol with a hydroxyl number of 28 which has been obtained by the addition of a mixture of 80% of propylene oxide and 20% of ethylene oxide to propylene glycol and 20 parts by weight of a poly(alkylene ether)polyol with a hydroxyl number of 32 which has been obtained by the addition of a mixture of 87% of propylene oxide and 13% of ethylene oxide to trimethylolpropane;
14 parts by weight of butane-1,4-diol,
1 part by weight of ethylene glycol,
0.6 part by weight of triethylene diamine,
0.06 part by weight of dibutyl tin (IV) dilaurate,
0.1 part by weight of water,
4 parts by weight of monofluorotrichloromethane,
2 parts by weight of methylene chloride,
6 parts by weight of "internal mold-release agent" C
51 parts by weight of a polyisocyanate based on polydiphenylmethane-4,4'-diisocyanate which has been described in Example 2.

The polyol mixture and blowing agent are mixed with the isocyanate using a two-component feeding and mixing apparatus and introduced into a closed tempered aluminum mold. The temperature of this mold is 60° C. The synthetic resin mixture begins to foam after 9 seconds and sets after a further 10 seconds.

The molded product can be removed from the aluminum mold after 3 minutes without adhering to it. It has an overall gross density of 0.80 g/cm³ and a thickness of 10 mm with a solid marginal zone on both sides.

EXAMPLE 6

100 parts by weight of a polyol mixture with a hydroxyl number of 205 and a viscosity of 950 cP at 25° C, consisting of 70 parts by weight of a poly(alkylene ether)glycol with a hydroxyl number of 28 which has been obtained by the addition of a mixture of 80% of propylene oxide and 13% of ethylene oxide to propylene glycol and
20 parts by weight of a poly(alkylene ether)polyol with a hydroxyl number of 32 which has been obtained by the addition of a mixture of 87% of propylene oxide and 13% of ethylene oxide to trimethylolpropane; and, in addition,
14 parts by weight of butane-1,4-diol,
1 part by weight of ethylene glycol,
0.6 part by weight of triethylene diamine,
0.06 part by weight of dibutyl tin (IV) dilaurate,
0.1 part by weight of water,
4 parts by weight of monofluorotrichloromethane,
2 parts by weight of methylene chloride and
6 parts by weight of "internal mold-release agent" D
are reacted with 51 parts by weight of a polyisocyanate based on diphenylmethane-4,4'-diisocyanate which has been described in Example 2.

The polyol mixture and blowing agent are mixed with the isocyanate using a two-component feeding and mixing apparatus and introduced into a closed tempered aluminum mold. The temperature of this mold is 60° C. The synthetic resin mixture begins to foam after 9 seconds and sets after a further 10 seconds.

The molded product can be removed from the aluminum mold after 3 minutes without adhering to it. It has an overall gross density of 0.80 g/cm³ and a thickness of 10 mm with a solid marginal zone on both sides.

EXAMPLE 7

The following components are used: 100 parts by weight of a polyol mixture with a hydroxyl number of 205 and a viscosity of 950 cP at 25° C, consisting of 70 parts by weight of a poly(alkylene ether)glycol with a hydroxyl number of 28 which has been obtained by the addition of a mixture of 80% of propylene oxide and 20% of ethylene oxide to propylene glycol and
20 parts by weight of a poly(alkylene ether)polyol with a hydroxyl number of 32 which has been obtained by the addition of a mixture of 87% of propylene oxide and 13% of ethylene oxide to trimethylolpropane; and, in addition,
14 parts by weight of butane 1,4-diol,
1 part by weight of ethylene glycol,
0.6 part by weight of triethylene diamine,
0.06 part by weight of dibutyl tin (IV) dilaurate,
0.1 part by weight of water,
4 parts by weight of monofluorotrichloromethane,
2 parts by weight of methylene chloride and
6 parts by weight of "internal mold-release agent" E as well as 51 parts by weight of a polyisocyanate based on diphenylmethane-4,4'-diisocyanate which has been described in Example 2.

The polyl mixture and blowing agent are mixed with the isocyanate using a two-component feeding and mixing apparatus and introduced into a closed tempered aluminum mold. The temperature of this mold is 60° C. The synthetic resin mixture begins to foam after 9 seconds and sets after a further 10 seconds.

The molded product can be removed from the aluminum mold after 3 minutes without adhering to it. It has an overall gross density of 0.80 g/cm³ and a thickness of 10 mm with a solid marginal zone on both sides.

EXAMPLE 8

100 parts by weight of a polyol mixture with a hydroxyl number of 205 and a viscosity of 950 cP at 25° C, consisting of 70 parts by weight of a poly(alkylene ether)glycol with a hydroxyl number of 28 which has been obtained by the addition of a mixture of 80% of propylene oxide and 20% of ethylene oxide to propylene glycol and
20 parts by weight of a poly(alkylene ether)polyol with a hydroxyl number of 32 which has been obtained by the addition of a mixture of 87% of propylene oxide and 13% of ethylene oxide to trimethylolpropane; and, in addition,
14 parts by weight of butane-1,4-diol,
1 part by weight of ethylene glycol,
0.6 part by weight of triethylene diamine
0.06 part by weight of dibutyl tin (IV) dilaurate
0.1 part by weight of water,
4 parts by weight of monofluorotrichloromethane,
2 parts by weight of methylene chloride and
6 parts by weight of "internal mold-release agent" F
are reacted with 51 parts by weight of a polyisocyanate based on diphenylmethane-4,4'-diisocyanate which has been described in Example 2.

The polyol mixture and blowing agent are mixed with the isocyanate using a two-component feeding and mixing apparatus and introduced into a closed tempered aluminum mold which is at a temperature of 60° C. The synthetic resin mixture begins to foam after 9 seconds and sets after a further 10 seconds.

The molded product can be removed from the aluminum mold after 3 minutes without adhering to it. It has an overall gross density of 0.80 g/cm³ and a thickness of 10 mm with a solid marginal zone on both sides.

EXAMPLE 9

The following components are used: 100 by weight of a polyol mixture with a hydroxyl number of 205 and a viscosity of 950 cP at 25° C consisting of 70 parts by weight of a poly(alkylene ether)glycol with a hydroxyl number of 28 which has been obtained by the addition of a mixture of 80% of propylene oxide and 20% of ethylene oxide to propylene glycol and 20 parts by weight of a poly(alkylene ether)polyol with a hydroxyl number of 32 which has been obtained by the addition of a mixture of 87% of propylene oxide and 13% of ethylene oxide to trimethylolpropane; and, in addition,
14 parts by weight of butane-1,4-diol,
1 part by weight of ethylene glycol,
1 part by weight of triethylene diamine,
0.08 part by weight of dibutyl tin (IV) dilaurate
0.1 part by weight of water,
4 parts by weight of monofluorotrichloromethane,
2 parts by weight of methylene chloride and
6 parts by weight of "internal mold-release agent" G
51 parts by weight of a polyisocyanate based on diphenylmethane-4,4'-diisocyanate which has been described in Example 2.

The polyol mixture and mold-release agent are mixed with the isocyanate using a two-component feeding and mixing apparatus and introduced into a closed tempered aluminum mold which is at a temperature of 60° C. The synthetic resin mixture begins to foam after 9 seconds and sets after a further 10 seconds.

The molded product can be released from the aluminum mold after 3 minutes without adhering to it. It has an overall gross density of 0.80 g/cm³ and a thickness of 10 mm with a solid marginal zone on both sides.

EXAMPLE 10

The following components are used: 100 parts by weight of a polyol mixture with a hydroxyl number of 205 and a viscosity of 950 cP at 25° C, consisting of 70 parts by weight of a poly(alkylene ether)glycol with a hydroxyl number of 28 which has been obtained by the addition of a mixture of 80% of propylene oxide and 20% of ethylene oxide to propylene glycol and 20 parts by weight of a poly(alkylene ether)polyol with a hydroxyl number of 32 which has been obtained by the addition of a mixture of 87% of propylene oxide and 13% of ethylene oxide to trimethylolpropane; as well as
14 parts by weight of butane-1,4-diol,
1 part by weight of ethylene glycol,
1 part by weight of triethylene diamine,
0.08 part by weight of dibutyl tin (IV) dilaurate
0.1 part by weight of water,
4 parts by weight of monofluorotrichloromethane,
2 parts by weight of methylene chloride and
6 parts by weight of "internal mold-release agent" H and in addition
51 parts by weight of a polyisocyanate based on diphenylmethane-4,4'-diisocyanate which has been described in Example 2.

The polyol mixture and mold-release agent are mixed with the isocyanate using a two-component feeding and mixing apparatus and introduced into a closed tempered aluminum mold which is at a temperature of 60° C. The synthetic resin mixture begins to foam after 9 seconds and sets after a further 10 seconds.

The molded product can be removed from the aluminum mold after 3 minutes without adhering to it. It has an overall gross density of 0.80 g/cm³ and a thickness of 10 mm with a solid marginal zone on both sides.

EXAMPLE 11

The following components are used: 100 parts by weight of a polyol mixture with a hydroxyl number of 205 and a viscosity of 950 cP at 25° C consisting of 70 parts by weight of a poly(alkylene ether)glycol with a hydroxyl number of 28 which has been obtained by the addition of a mixture of 80% of propylene oxide and 20% of ethylene oxide to propylene glycol and 20 parts by weight of a poly(alkylene ether)polyol with a hydroxyl number of 32 which has been obtained by the addition of a mixture of 87% of propylene oxide and 13% of ethylene oxide to trimethylolpropane; and, in addition,
14 parts by weight of butane-1,4-diol,
1 part by weight of ethylene glycol,
1 part by weight of triethylene diamine,
0.08 part by weight of dibutyl tin (IV) dilaurate,
0.1 part by weight of water,
4 parts by weight of monofluorotrichloromethane,
2 parts by weight of methylene chloride and
6 parts by weight of "internal mold-release agent" I, as well as
51 parts by weight of a polyisocyanate based on diphenylmethane-4,4'-diisocyanate which has been described in Example 2.

The polyol mixture and blowing agent are mixed with the isocyanate using a two-component feeding and mixing apparatus and introduced into a closed tempered aluminum mold which is at a temperature of 60° C. The synthetic resin mixture begins to foam after 9 seconds and sets after a further 10 seconds.

The molded product can be removed from the aluminum mold after 3 minutes without adhering to it. It has an overall gross density of 0.80 g/cm³ and a thickness of 10 mm with a solid marginal zone on both sides.

EXAMPLE 12

The following components are used: 100 parts by weight of a polyol mixture with a hydroxyl number of 530 and a viscosity of 1430 cP at 25° C, consisting of 60 parts by weight of a poly(alkylene ether)polyl with a hydroxyl number of 850 which has been obtained by the addition of 1 mol of propylene oxide to 1 mol of trimethylolpropane and 40 parts by weight of a poly(alkylene ether)polyol with a hydroxyl number of 46 which has been obtained by the addition of a mixture of 87% of propylene oxide and 13% of ethylene oxide to a mixture of trimethylolpropane and propylene glycol; and in addition,
2 parts by weight of silicone stabilizer (commerical product)
3 parts by weight of dimethyl benzylamine,
0.9 part by weight of tetramethyl guanidine,
0.2 part by weight of 85% phosphoric acid,
6 parts by weight of Baysilon oleic acid ester according to Example B and 12 parts by weight of monofluorotrichloromethane as well as 141 parts by weight of a polyisocyanate which has been prepared by the phosgenation of aniline-formaldehyde condensates and which has a viscosity of 90 cP at 25° C and an isocyanate content of 31%.

The polyol mixture, blowing agent and isocyanate are mixed using a two-component feeding and mixing apparatus and introduced into a closed mold, the top half of which is aluminum and the bottom half galvanized nickel, which is at a temperature of 60° C. The synthetic resin mixture begins to foam after 15 seconds and sets after a further 13 seconds. The molded product is removed from the mold after 5 minutes. The mold-release forces required for this are measured accurately. The specific mold-release forces are between 0.1 and 0.3 kp/cm$^2$. The molded product has an overall gross density of 0.40 g/cm$^3$ and a thickness of 10 mm with a solid marginal zone on both sides. The elastic modulus of the material is in the region of 10,000 kp/cm$^2$.

EXAMPLE 13

The procedure is the same as described in Example 12 but instead of the isocyanate, there is used an isocyanate mixture consisting of 122 parts by weight of a polyisocyanate which has been prepared by phosgenating aniline-formaldehyde condensates and which has a viscosity of 90 cP at 25° C and an isocyanate content of 31% and 18 parts by weight of a semi-prepolymer of 70 parts by weight of the polyisocyanate described above and 30 parts by weight of a difunctional polymethyl siloxane which contains a —CH$_2$—OH group at each end and has a hydroxyl content of about 6%.

The specific mold-release forces in the metal mold, one half of which is made of aluminum and the other of galvanized nickel, are below 0.1 kp/cm$^2$.

Any of the other mold release agents provided by the invention may be substituted for those used in the foregoing examples. As is apparent from the disclosure, this invention contemplates broadly the foaming of all foamable compositions which produce polyurethane foams and is not concerned with the provision of any new organic polyisocyanate polyols or other conventional components of such a foamable reaction mixture. The invention, on the other hand, provides a new mold release compound for those heretofore known moldable foamable mixtures.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for molding foam plastics in a closed mold by foaming a reaction mixture containing an organic polyisocyanate, an organic compound having a molecular weight of about 62 to about 10,000 which has at least two reactive hydrogen atoms, and a blowing agent, the improvement which comprises including in the reaction mixture, as an internal mold release agent, an esterification reaction product of a polysiloxane which contains —CH$_2$OH groups which are attached directly to a silicon atom, and a monocarboxylic or polycarboxylic acid, with the proviso that the esterification reaction is conducted in such a manner that in the case of polycarboxylic acids, substantially only one carboxylic group of the polycarboxylic acid is reacted for each —CH$_2$OH group of the polysiloxane.

2. The process of claim 1, wherein the mold release agent is the reaction product of a polysiloxane which contains —CH$_2$—OH groups and a monocarboxylic acid.

3. The process of claim 2, wherein the monocarboxylic acid is a fatty acid containing from 12 to 20 carbon atoms.

4. The process of claim 3, wherein the fatty acid is oleic acid, linoleic acid, ricinoleic acid or mixture of two or more of these acids.

5. The process of claim 1, wherein the carboxylic acid is maleic acid or its anhydride.

6. The process of claim 1, wherein the polysiloxane is a linear polydimethyl siloxane and has a hydroxyl content of about 2% to about 8% by weight.

7. The process of claim 1, wherein the polyisocyanate is the phosgenation product of aniline-formaldehyde condensates.

8. The process of claim 1, wherein the polyisocyanate contains carbodiimide groups.

9. The process of claim 1, wherein the polyisocyanate is the reaction product of a diol or triol which has a molecular weight of about 62 to about 500 and a monomeric polyisocyanate.

10. The process of claim 1, wherein a mixture of mold-release agents is added to the reaction mixture.

11. The product of the process of claim 1.

12. A foam cushion prepared by the process of claim 1.

13. The process of claim 1 wherein the polysiloxane is of the formula $$AR_2SiO-(R_2SiO)_n-SiR_2A$$

wherein
n has a value of from 1 to 100,
R represents methyl and/or phenyl and
A represents a —CH$_2$OH group.

14. The process of claim 13 wherein n has a value of from 3 to 20.

15. The process of claim 1 wherein the polysiloxane is of the formula:

$$HO-CH_2-\underset{\underset{CH_3}{|}}{\overset{\overset{CH_3}{|}}{Si}}-O\left[-\underset{\underset{CH_3}{|}}{\overset{\overset{CH_3}{|}}{Si}}-O\right]_n-\underset{\underset{CH_3}{|}}{\overset{\overset{CH_3}{|}}{Si}}-CH_2OH$$

wherein $n$ is 3 to 20.

* * * * *